United States Patent
Kavakka et al.

(10) Patent No.: US 10,899,850 B2
(45) Date of Patent: Jan. 26, 2021

(54) METHODS FOR TREATING LIGNOCELLULOSIC MATERIALS

(71) Applicant: Stora Enso OYJ, Helsinki (FI)

(72) Inventors: Jari Kavakka, Stockholm (SE); Mari Granstrom, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/580,818

(22) PCT Filed: Jun. 9, 2016

(86) PCT No.: PCT/IB2016/053378
§ 371 (c)(1),
(2) Date: Dec. 8, 2017

(87) PCT Pub. No.: WO2016/199042
PCT Pub. Date: Dec. 15, 2016

(65) Prior Publication Data
US 2018/0162958 A1   Jun. 14, 2018

(30) Foreign Application Priority Data

Jun. 10, 2015  (SE) .................................... 1550773

(51) Int. Cl.
*C08B 37/00* (2006.01)
*C08H 8/00* (2010.01)
*C13K 13/00* (2006.01)

(52) U.S. Cl.
CPC ...... *C08B 37/0057* (2013.01); *C08B 37/0003* (2013.01); *C08H 8/00* (2013.01); *C13K 13/002* (2013.01)

(58) Field of Classification Search
CPC .......................... C08B 37/0057; C08B 37/0003
USPC ..................................................... 536/123.1
See application file for complete search history.

(56) References Cited

U.S. PATENT DOCUMENTS

| | | | |
|---|---|---|---|
| 3,687,807 A | 8/1972 | Stranger-Johannessen | |
| 3,716,526 A | 2/1973 | Schweiger | |
| 3,935,022 A | 1/1976 | Sihtola | |
| 2006/0128952 A1 | 6/2006 | Schroder et al. | |
| 2009/0062232 A1* | 3/2009 | Fujikawa | A23L 2/52 514/54 |
| 2009/0099354 A1* | 4/2009 | Axegard | C07H 1/06 536/128 |
| 2010/0276093 A1 | 11/2010 | Varma | |

FOREIGN PATENT DOCUMENTS

| | | |
|---|---|---|
| CN | 1431231 A | 7/2003 |
| CN | 1687094 A | 10/2005 |
| EP | 636633 A1 * | 2/1995 |
| WO | 2007120091 A1 | 10/2007 |
| WO | WO 2012010401 A2 * | 1/2012 |
| WO | 2015009145 A1 | 1/2015 |
| WO | 2015034964 | 3/2015 |
| WO | 2016121648 A1 | 8/2016 |

OTHER PUBLICATIONS

International Search Report for PCT/IB2016/053378, dated Oct. 17, 2016.
Montgomery, R. et al. "Structure of Corn Hull Hemicellulose. Part 111. Identification of the Methylated Aldobiouronic Acid Obtained from Methyl Corn Hull Hemicellulose", J. Am. Chem. Soc, 1957, vol. 79, No. 3, pp. 395-697.
Deutschmann, R. et al. "From plant biomass to bio-based chemicals: Latest developments in xylan research", Biotechnology Advances, vol. 30, pp. 1627-1640.

* cited by examiner

Primary Examiner — Shaojia A Jiang
Assistant Examiner — Michael C Henry
(74) Attorney, Agent, or Firm — Greer, Burns & Crain, Ltd.

(57) ABSTRACT

Methods for producing refined xylan from a biomass solution, including: (i) providing a biomass solution, which comprises xylan; (ii) concentrating or separating said biomass solution to obtain a xylan concentrate comprising xylan and impurities; (iii) washing and/or extracting the xylan concentrate with a solvent to obtain refined xylan and a solvent stream comprising the solvent and impurities; and (iv) collecting the refined xylan.

15 Claims, 1 Drawing Sheet

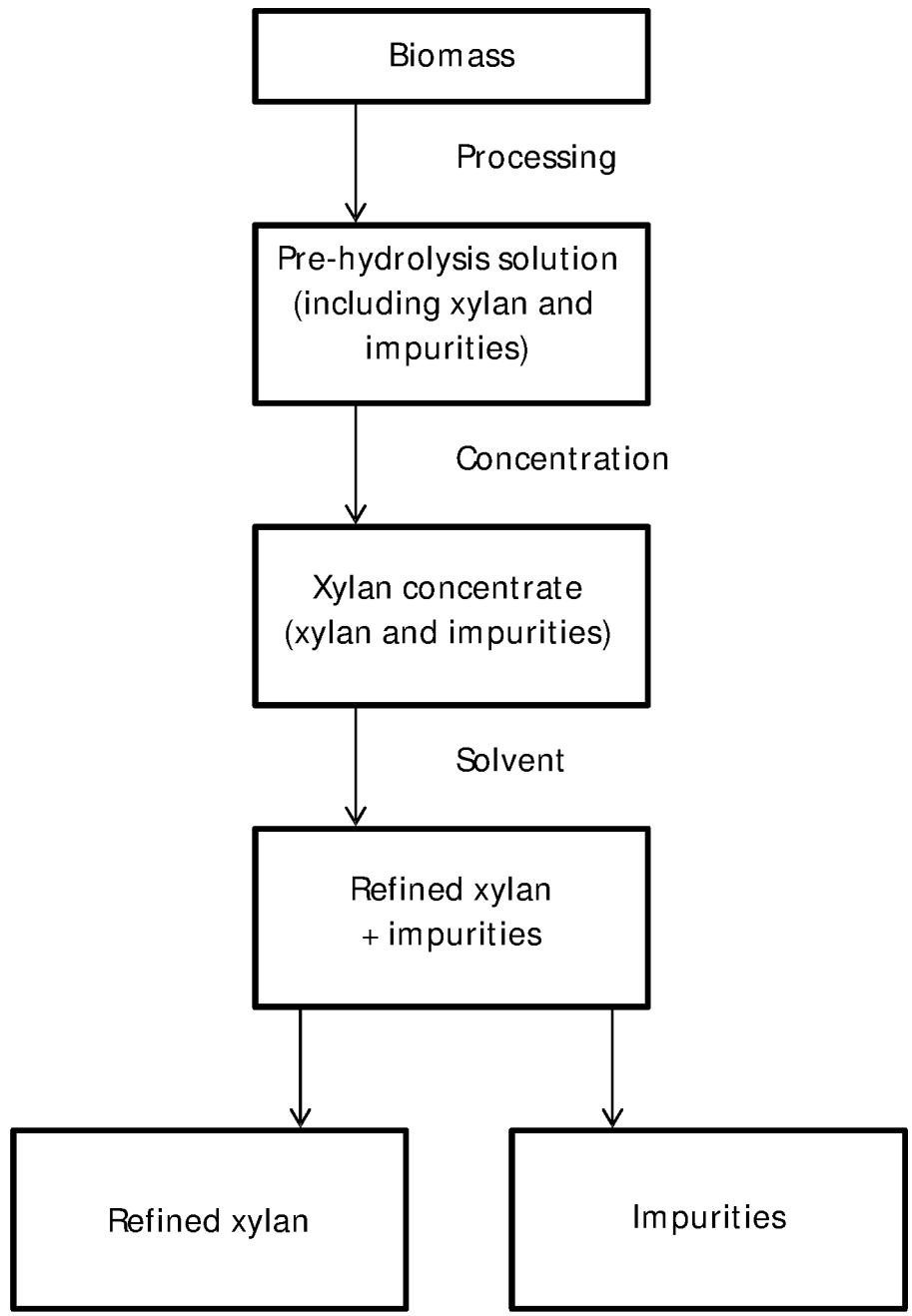

METHODS FOR TREATING LIGNOCELLULOSIC MATERIALS

This application is a U.S. National Stage under 35 U.S.C. § 371 of International Application No. PCT/IB2016/053378, filed Jun. 9, 2016, which claims priority to Swedish Patent Application No. 1550773-4, filed Jun. 10, 2015.

FIELD OF THE INVENTION

Aspects of the disclosure provide methods for producing refined xylan from a biomass solution. Such methods are practiced by providing a biomass solution, which comprises xylan; concentrating or separating said biomass solution to obtain a xylan concentrate comprising xylan and impurities; washing and/or extracting the xylan concentrate with a solvent to obtain refined xylan and a solvent stream comprising the solvent and impurities; and collecting the refined xylan.

BACKGROUND OF THE INVENTION

Xylan is a group of hemicelluloses made from units of xylose. It is found in the cell walls of plants, and next to cellulose it is the most abundant renewable polysaccharide in nature. Xylan is a β-1,4-linked D-xylose polymer with arabinofuranose, glucuronic acid, methylglucuronic acid, and acetyl side groups. Typically the content of xylans in hardwoods is 10-35% of the hemicelluloses and in softwoods they are 10-15% of the hemicelluloses. Xylans can be refined (see e.g., WO 2013144446, herein expressly incorporated by reference in its entirety) and refined xylan is useful as an auxiliary agent, thickening agent, an emulsifier, and as an additive in the manufacture of cellulose based fibre, papermaking, food products, cosmetic products, and coating agents. Xylan can also be used to obtain xylose. There remains a need for additional approaches to refine xylan.

SUMMARY OF THE INVENTION

Several methods of generating refined xylan from a biomass solution are disclosed. In some alternatives, these methods are practiced by: (i) providing a biomass solution, which comprises xylan; (ii) concentrating or separating said biomass solution to obtain a xylan concentrate comprising xylan and impurities; (iii) washing the xylan concentrate with a solvent to obtain refined xylan and a solvent stream comprising the solvent and impurities; and (iv) collecting the refined xylan.

In some alternatives, these methods further comprise adding a buffer to said biomass solution prior to step (i), wherein said buffer comprises a salt of an acid and has a $pK_a$ value of 3-7. In more alternatives, the salt of said acid is an aromatic or aliphatic carboxylic acid salt. In one alternative, the salt of said acid is a salt of an inorganic acid. In still more alternatives, the salt of said acid is sodium acetate.

In some alternatives, the biomass solution is concentrated by evaporation at step ii).

In some alternatives, the solvent is selected from the group consisting of ethylene carbonate, propylene carbonate, 1,2-butylene carbonate, cis-2,3-butylene carbonate, trans-2,3-butylene carbonate, diethyl carbonate, dimethyl carbonate, acetic acid, acetone, methyl ethyl ketone, isopropanol, 2-butanol, 1-propanol, ethanol, methanol, propanoic acid, butanoic acid, and methyl isobutyl ketone, or the solvent is any combination of the foregoing solvents. In one preferred alternative, the solvent includes acetic acid. In another preferred alternative, the solvent includes acetone. In another preferred alternative, the solvent is acetone, methyl ethyl ketone or methyl isobutyl ketone. In another preferred alternative, the solvent is methyl ethyl ketone or methyl isobutyl ketone. In another alternative, the solvent is selected from ethylene carbonate, propylene carbonate, 1,2-butylene carbonate, cis-2,3-butylene carbonate, trans-2,3-butylene carbonate, diethyl carbonate, dimethyl carbonate. In some approaches, the xylan concentrate is washed with one or more solvents at step iii) under heating at a temperature of 30-180° C.

Some alternatives concern methods, wherein the refined xylan is separated by filtration. Some alternatives concern methods, wherein the refined xylan is collected by centrifugation. Some alternatives concern methods, wherein the refined xylan is collected by sedimentation.

In some alternatives, the method further includes recycling the solvent for use in a subsequent step (iii).

BRIEF DESCRIPTION OF THE DRAWINGS

FIG. 1 illustrates a scheme for the isolation and/or purification of xylan from a biomass solution.

DETAILED DESCRIPTION OF THE PREFERRED EMBODIMENT

The alternatives described herein relate to lignocellulosic biomass processing and refining conducted to produce xylan, lignin, cellulose and other high-value products. In some alternatives, methods of generating xylan from a biomass hydrolysis solution are disclosed. These methods include: i) providing a biomass solution, which comprises xylan; (ii) concentrating or separating said biomass solution to obtain a xylan concentrate comprising xylan and impurities; (iii) washing the xylan concentrate with a solvent to obtain a refined xylan and a solvent stream comprising the solvent and impurities; and (iv) collecting the refined xylan.

Desirably, aspects of the invention described herein allow for the isolation of a sugar stream that is enriched in hemicelluloses, such as xylan, after a single extraction of a biomass hydrolysis solution, e.g., a solvent extraction accomplished for instance by the addition of heat, such as 30° C.-100° C., in the absence of chromatographic procedures, which can be required to enrich a sugar stream for monomeric and/or oligomeric sugars, such as a xylan. It has been surprisingly discovered that a class of solvents that has not been previously recognized for sugar extraction, quite efficiently separates xylan from impurities. These solvents are antisolvents for xylan at room temperature, and reach solubility by heating. Upon cooling, only xylan precipitates out, leaving all of the remaining impurities behind in a given solvent. Additionally, the solvent can be efficiently recycled and reused, which contributes to a significant cost savings on an industrial scale.

By some methods, the lignocellulosic biomass processing and refining processes described herein comprises: (1) preconditioning of the lignocellulosic biomass; (2) concentrating or separating said biomass solution to obtain a xylan concentrate comprising xylan and impurities, e.g., removing the water from the preconditioned lignocellulosic biomass solution; and (3) solvent extraction (for instance, in the presence of acetic acid, acetone, methyl ethyl ketone, isopropanol, 2-butanol, 1-propanol, ethanol, methanol, propanoic acid, butanoic acid, and/or methyl isobutyl ketone, herein also referred to as "antisolvents for xylane"). The section below describes in greater detail the preconditioning of the lignocellulosic biomass.

Preconditioning of the Lignocellulosic Biomass

While xylan can be refined from a variety of plant materials, e.g., soft woods such as, spruce or pine; plants such as, bagasse; preferably, hardwoods, such as birch, are used as the lignocellulosic starting material. Birch is an excellent source of xylan. In birch, xylan is particularly pure, because 98% of the hemicelluloses in birch consist of xylan. Furthermore, birch has an exceptionally high content of xylan, and therefore the yield of xylan obtained from birch is high, up to about 10% of the dry content of the wood. Accordingly, hardwood pulp comprising of unrefined or slightly refined chemically defibrated wood fibres can be used in some of the methods described herein.

Lignocellulosic biomass processing and refining begins with a preconditioning of the lignocellulosic biomass, whereby the biomass is debarked, chipped, shred, dried, bleached, and/or ground to particles so as to generate a conditioned lignocellulose preparation. Preconditioning in this context refers to the reduction in biomass size and structure (e.g., mechanical breakdown with or without evaporation), which does not substantially affect the lignin, cellulose and hemicellulose compositions of the biomass. Preconditioning in this manner facilitates more efficient and economical processing of a downstream process (e.g., xylan refinement). In some alternatives, preconditioning of the lignocellulosic biomass can also utilize, for example, ultrasonic energy or hydrothermal treatments including water, heat, steam and/or pressurized steam. Preconditioning can occur or be deployed in various types of containers, reactors, pipes, flow through cells and the like. In some methods, it is preferred to have the lignocellulosic biomass preconditioned before hemicellulose refinement. In some methods, depending on the biomass starting materials, no preconditioning is required.

In some alternatives, the lignocellulosic biomass (e.g., birch or bagasse) is milled or ground to reduce particle size. In some embodiments, the lignocellulosic biomass (e.g., birch or bagasse) is ground such that the average size of the particles is in the range of 100-10,000 micron, preferably 400-5,000, e.g., 100-400, 400-1,000, 1,000-3,000, 3,000-5,000, or 5,000-10,000 microns or to a size within a range defined by any two of the aforementioned sizes. In some alternatives, the lignocellulosic biomass is ground such that the average size of the particles is less than 10,000, 9,000, 8,000, 7,000, 6,000, 5,000, 4,000, 3,000, 1,000, or 400 microns or within a range defined by any two of the aforementioned sizes. Ground particles from different lignocellulosic biomass materials can be processed by the same set of equipment using similar or same operating parameters.

Once the lignocellulosic biomass (e.g., birch or bagasse) has been preconditioned or in some alternatives, in the absence of preconditioning, a liquid, such as water (preferably hot water or steam), is added to the lignocellulosic biomass (e.g., birch or bagasse) so as to obtain a biomass solution that comprises xylan. In one embodiment, spent liquor from NSSC (neutral sulfite semi-chemical) pulping process may be the biomass solution from which xylan is refined according to the present invention. In some alternatives, a buffer is added to the biomass solution (e.g., the liquid added to the lignocellulosic biomass (e.g., birch or bagasse) can be a buffered liquid or a liquid can be added to a buffer and the lignocellulosic biomass (e.g., birch or bagasse)) so as to obtain a buffered biomass solution. In some alternatives, the buffer comprises a salt of an acid and has a $pK_a$ value of 3, 4, 5, 6, or 7 or a $pK_a$ value within a range defined by any two of the aforementioned $pK_a$ values. In some alternatives, the buffer comprises a salt of an acid that is an aromatic or aliphatic carboxylic acid salt. In some alternatives, the buffer comprises a salt of an acid that is an inorganic acid salt. In some alternatives, the buffer comprises sodium acetate.

Concentration

With reference to FIG. 1, in some alternatives, the method comprises concentrating or separating the biomass solution to obtain a xylan concentrate, which comprises xylan and impurities. In one alternative, the biomass solution is concentrated by evaporation so as to obtain the xylan concentrate. More generally, the biomass solution is concentrated by the removal of water, which can be done by many approaches. In one embodiment, most but not all of the water is removed during the concentration step. In one embodiment, the biomass solution is concentrated to be essentially dry.

Washing/Extraction

With reference to FIG. 1, in some alternatives, the xylan concentrate is washed and/or extracted with a solvent, such as ethylene carbonate, propylene carbonate, 1,2-butylene carbonate, cis-2,3-butylene carbonate, trans-2,3-butylene carbonate, diethyl carbonate, dimethyl carbonate, acetic acid, acetone, methyl ethyl ketone, isopropanol, 2-butanol, 1-propanol, ethanol, methanol, propanoic acid, butanoic acid, or methyl isobutyl ketone, or any combination thereof so as to obtain refined xylan having a reduced amount of impurities and a solvent stream comprising the solvent and impurities. In some alternatives, the solvent used comprises acetic acid and in some alternatives the solvent used comprises acetone. In another preferred alternative, the solvent is methyl ethyl ketone or methyl isobutyl ketone. In another alternative, the solvent is selected from ethylene carbonate, propylene carbonate, 1,2-butylene carbonate, cis-2,3-butylene carbonate, trans-2,3-butylene carbonate, diethyl carbonate, dimethyl carbonate. In some alternatives, the washing and/or extraction is performed in the presence of heat, such as 30° C.-180° C. That is, the washing and/or extraction can be performed at 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180° C. or at a temperature that is within a range defined by any two of the aforementioned temperatures. In some alternatives, the washing and/or extraction is carried out without addition of organic acid to the xylan concentrate. It has been found that the present invention efficiently refines xylan and avoids the deterioration of xylan that may otherwise be caused by organic acids, particularly at elevated temperatures.

After washing and/or extraction, in some alternatives, the refined xylan is collected by filtration, centrifugation, sedimentation, or any combination thereof, optionally during cooling. After the separation of xylan, the solvent can be recycled for subsequent rounds of extraction, so as to improve the yield of xylan from the biomass solution.

Products

The refined xylan obtained by any one or more of the methods described herein can be used as a raw material for bacterial and chemical production of xylose, xylonic acid, xylaric acid, 2-methylfuran, 2-methyltetrahydrofuran, furan, furfuryl alcohol, tetrahydrofurfuryl alcohol, furfuryl amine, furoic acid, furfural and tetrahydrofuran. Xylan can also be used as the starting material for preparing xylitol, a low calorie alternative sweetener that has beneficial properties for dental care and diabetes management, and has been shown to contribute to clearing ear and upper respiratory tract infections. Given these beneficial properties, xylitol is incorporated in food and beverages, toothpastes and mouth wash products, chewing gums and confectionary products. World xylitol market is limited due to its high price compared to other non-reducing polyol sugars (e.g., sorbitol, mannitol).

The xylan obtained by one or more of the processes described herein can also be reacted with chlorambucil to obtain benzenebutanoic acid, 4-[bis(2-chloroethyl)amino]-, 2-P-D-xylopyranosylhydrazide, a glycosylated chlorambucil analog which is useful as antitumor and/or anti-metastatic agent. Xylan may be reacted with phenethyl bromide and 1-bromo-3,3-dimethoxypropane to obtain (2S,3S,4S)-2H-Pyrrole, 3,4-dihydro-3,4-bis(phenyl-methoxy)-2-[(phenyl-methoxy)methyl]-, 1-oxide, used as α-glucosidase inhibitor for preventing and/or treating diabetes mellitus, hyperlipidemia, neoplasm, and viral infection.

Although the invention has been described with reference to embodiments and examples, it should be understood that various modifications can be made without departing from the spirit of the invention. Accordingly, the invention is limited only by the following claims. All references cited herein are hereby expressly incorporated by reference in their entireties.

The invention claimed is:

1. A method of producing refined xylan from a biomass solution, comprising:
  i) providing a biomass solution, which comprises xylan, wherein the biomass solution comprises a spent liquor from an NSSC pulping process;
  ii) concentrating said biomass solution to obtain a xylan concentrate comprising xylan and impurities;
  iii) mixing the xylan concentrate with a solvent which is selected from the group consisting of isopropanol, 2-butanol, 1-propanol, ethanol, methanol, ethylene carbonate, propylene carbonate, 1,2-butylene carbonate, cis-2,3-butylene carbonate, trans-2,3-butylene carbonate, diethyl carbonate, dimethyl carbonate, acetone, methyl ethyl ketone and methyl isobutyl ketone, and then heating the mixture, and subsequently cooling the mixture after heating to precipitate xylan from the mixture and obtain refined xylan and a solvent stream comprising the solvent and impurities from the xylan concentrate; and
  iv) collecting the refined xylan,
  wherein step iii) is carried out without addition of organic acid to the xylan concentrate.

2. A method according to claim 1, wherein the solvent in step iii) is selected from ethylene carbonate, propylene carbonate, 1,2-butylene carbonate, cis-2,3-butylene carbonate, trans-2,3-butylene carbonate, diethyl carbonate, dimethyl carbonate, acetone methyl ethyl ketone and methyl isobutyl ketone.

3. A method according to claim 2, wherein the solvent in step iii) is selected from ethylene carbonate, propylene carbonate, 1,2-butylene carbonate, cis-2,3-butylene carbonate, trans-2,3-butylene carbonate, diethyl carbonate and dimethyl carbonate.

4. A method according to claim 1, wherein the solvent in step iii) is selected from acetone, methyl ethyl ketone and methyl isobutyl ketone.

5. A method according to claim 4, wherein the solvent in step iii) is selected from methyl ethyl ketone and methyl isobutyl ketone.

6. The method of claim 1, further comprising adding a buffer to said biomass solution prior to step (i), wherein said buffer comprises a salt of an acid and has a pKa value of 3-7.

7. The method of claim 6, wherein the salt of said acid is an aromatic or aliphatic carboxylic acid salt.

8. The method of claim 6, wherein the salt of said acid is an inorganic acid salt.

9. The method of claim 6, wherein the salt of said acid is sodium acetate.

10. The method of claim 1, wherein the biomass solution is evaporated at step ii).

11. The method of claim 1, wherein the mixture is heated to a temperature of 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, or 180° C. or at a temperature that is within a range defined by any two of the aforementioned temperatures.

12. The method of claim 1, wherein the refined xylan is separated by filtration.

13. The method of claim 1, wherein the refined xylan is collected by centrifugation.

14. The method of claim 1, wherein the refined xylan is collected by sedimentation.

15. The method of claim 1, further comprising recycling the solvent for use in a subsequent step (iii).

* * * * *